United States Patent [19]

Wada et al.

[11] Patent Number: 4,995,623
[45] Date of Patent: Feb. 26, 1991

[54] SEALING DEVICE FOR RECIPROCATING MEMBER

[75] Inventors: Noriyuki Wada; Satoshi Yamanaka, both of Fukushima, Japan

[73] Assignee: NOK Corporation, Tokyo, Japan

[21] Appl. No.: 242,742

[22] Filed: Sep. 9, 1988

[30] Foreign Application Priority Data

Sep. 11, 1987 [JP] Japan .............. 62-139213[U]
Sep. 17, 1987 [JP] Japan .............. 62-142020[U]

[51] Int. Cl.$^5$ ............................................. F16F 9/36
[52] U.S. Cl. .............................. 277/208; 188/322.17; 277/215
[58] Field of Search ............... 277/201, 202, 208–209, 277/210, 212 F, 215, 70, 152, 153; 188/322.17

[56] References Cited

U.S. PATENT DOCUMENTS

| | | | |
|---|---|---|---|
| 2,311,727 | 2/1943 | Bowers | 277/202 |
| 2,860,615 | 5/1957 | Mayes | 123/188 P |
| 3,144,256 | 8/1962 | Wright | 277/208 |
| 3,214,182 | 10/1965 | Herbraggen | 277/201 |
| 3,368,650 | 2/1968 | Wasdell | 277/70 |
| 3,621,952 | 11/1971 | Long et al. | 277/209 |
| 4,325,558 | 4/1982 | Poggio | 123/188 P |
| 4,695,061 | 9/1987 | Meisner et al. | 277/208 |
| 4,723,782 | 2/1988 | Müller | 277/208 X |
| 4,865,170 | 9/1989 | Ciepichal | 277/202 X |

FOREIGN PATENT DOCUMENTS 2516869 11/1976 Fed. Rep. of Germany ........ 277/70

*Primary Examiner*—Allan N. Shoap
*Assistant Examiner*—Scott Cummings
*Attorney, Agent, or Firm*—Kenyon & Kenyon

[57] ABSTRACT

A sealing device for use in contact with a reciprocating member such as a piston rod of an automotive shock absorber has a plurality of seal lips with tips which make resilient sliding contact with the surface of the reciprocating member. Chambers are formed between the tips of adjacent seal lips. The seal lip closest to an internal fluid to be sealed is designed to facilitate flow of the fluid into the chamber between this seal lip and the adjacent seal lip, across the region of contact between this seal lip and the reciprocating member. The design may include notches or grooves formed in the seal lip closest to the seal lip or specific design of tapered surfaces of this seal lip.

1 Claim, 5 Drawing Sheets

SEALING DEVICE FOR RECIPROCATING MEMBER

BACKGROUND OF THE INVENTION

The present invention relates to a sealing device for use in contact with a reciprocating member. More particularly, the invention is concerned with a sealing device having a plurality of seal lips and suitable for use in, for example, shock absorber of an automotive suspension system. Still more particularly, the invention provides a sealing device improved to attain a higher sealing effect with reduced tightness of contact of the seal lips.

Known sealing devices of the kind described, suitable for use in automotive suspension systems, will be described with specific reference to FIGS. 8 and 9A, 9B by way of example. Referring to FIG. 8, a shock absorber 109 used in an automotive suspension system has a reciprocating piston rod 110 and a rod guide 111 which supports and guides the piston rod 110. A cap 112 is mounted so as to surround the rod guide 111. The shock absorber 109 of this type usually has a sealing device 117 which is disposed between the rod guide 111 and the cap 112. The sealing device 117 makes a sliding contact with the piston rod 110 so as to seal the internal damping fluids such as an oil OL and a gas GS which are charged inside an inner cylinder 113 and an outer cylinder 114. FIGS. 9A and 9B show Examples of the sealing device suitable for use in combination with the reciprocating member such as the piston rod 110 of the shock absorber shown in FIG. 8. The sealing device 100 shown in FIG. 9A has a seal lip 103 which makes a sliding contact with the piston rod 110 when the device is used in the shock absorber of FIG. 8 and a dust lip 104 which also makes a sliding contact with the piston rod 110. The sealing device is reinforced with an internal metal ring 106 which is embedded in the peripheral portion 105 as illustrated.

FIG. 9B shows another known sealing device 101 which is provided with a plurality of seal lips 107 which project radially inward from the main part 108 of the sealing device so as to make sliding contact with the piston rod 110 thereby attaining a sealing effect.

The sealing device 100, 101 of the kind described, particularly when used in a shock absorber of an automotive suspension system, is essentially required to develop a small friction between itself and the reciprocating member, i.e., the piston rod 110, in order to improve the comfort of the passengers on the automobile incorporating the shock absorber 109, While effectively sealing the damping fluids such as oil and compressed gas. The sealing device 101 having a plurality of seal lips 107 provides a higher sealing effect on the damping fluids such as oil and compressed gas than the sealing device 100 which has only one seal lip. The sealing device 101, however, experiences a greater friction than the sealing device 100 does. Each seal lip 107 of the sealing device 101 has two tapered surfaces 107a, 107b which converge at the apex which is resiliently collapsed when the lip 107 contacts the piston rod 110. In order to attain a higher sealing effect, these tapered surfaces 107a and 107b make different angles $\alpha_1$ and $\beta_1$ to the surface of the piston rod 110, the angle $\alpha_1$ being greater than the angle $\beta_1$. According to this arrangement, oil is almost completely prevented from entering the space 115 between adjacent seal lips 107. Although a very small amount of oil is allowed to come into the space 115, the oil is easily scraped off the space 115 during reciprocating motion of the piston rod 110, so that the oil cannot effectively serve as a lubricant.

Another problem encountered with the sealing device 101 is that the compressed gas tends to leak through a flaw in the seal lip 107 however the flaw may be slight.

SUMMARY OF THE INVENTION

Accordingly, an object of the present invention is to provide a sealing device for use in combination with a reciprocating member, which is improved to remarkably enhance the sealing effect on the internal fluid while reducing the friction on the reciprocating member, thereby overcoming the above-described problems of the prior art.

To this end, according to the present invention, there is provided a sealing device for use in combination with a reciprocating member, having a plurality of seal lips which are held in sliding contact with the reciprocating member so as to prevent leakage of an internal fluid along the surface of the reciprocating member, the seal lips having the respective tips contacting the surface of the reciprocating member such that a chamber is formed between the tips of adjacent seal lips, the sealing device comprising: means provided on the seal lip closest to the internal fluid and capable of introducing the internal fluid into the chamber between the seal lip closest to the internal fluid and the adjacent seal lip.

In a preferred form of the sealing device according to the invention, the means includes at least one notch formed in the tip of the seal lip closest to the internal fluid or grooves or convexities and concavities formed on the entire circumferential length of the tapered surface of this seal lip adjacent to the internal fluid to be sealed. In another preferred form of the present invention, the means includes tapered surfaces of the seal lip closest to the internal fluid, the tapered surfaces being connected to the tip, wherein the tapered surface adjacent to the internal fluid makes a smaller angle to the reciprocating member than the tapered surface adjacent to the atmosphere does.

According to the invention, the means provided on the seal lip closest to the internal fluid and capable of introducing the fluid into the chamber across the contact region of this seal lip facilitates the the flow of a fluid such as an oil into this chamber. This fluid effectively lubricates the seal lips and reduces the friction on these seal lips, while attaining a higher sealing effect against leakage of another fluid such as a compressed gas.

DESCRIPTION OF THE PREFERRED EMBODIMENTS

Figure 1:
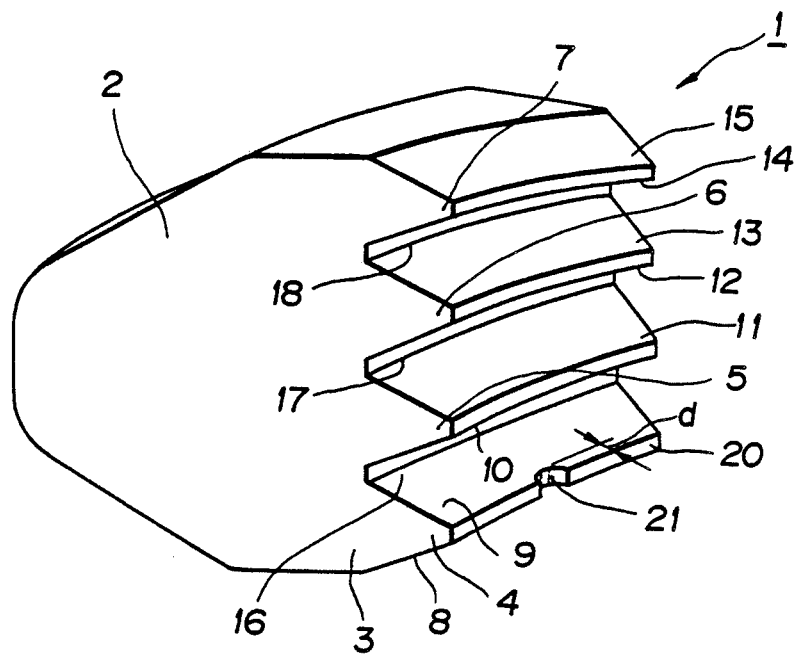
FIG. 1 is a perspective view of an embodiment of a sealing device in accordance with the present invention for use in combination with a reciprocating member.

Referring to FIG. 1, there is shown a sealing device in accordance with a first embodiment of the present invention. The sealing device, generally denoted by a numeral 1, is suitable but not exclusively for use in a shock absorber of an automotive suspension system. The sealing device 1 has a main part 2 which is provided on the inner peripheral surface thereof with four seal lips: namely, a first seal lip 4, a second seal lip 5, a third seal lip 6 and a fourth seal lip 7. The first seal lip 4 has an inward projection with both tapered surfaces 8 and 9. Similarly, the second to fourth seal lips 5 to 7 have inward projections with tapered surfaces 10,11; 12,13; and 14, 15. A recess or a chamber 16 is defined between adjacent tapered surfaces 9 and 10 of the first seal lip 4 and the second seal lip 5. Similarly, chambers 17 and 18 are formed between the respective pairs of adjacent seal lips as illustrated. Notches as substantially semi-circular recesses are formed in the crest or tip 20 of the first seal lip 4 which is closest to the fluid such as an oil. These notches 21 are formed at a suitable circumferential pitch along the inner peripheral edge, i.e., the tip 20, of the seal lip 4. Each notch 21 has a radial depth d which is large enough to hold an oil film, e.g., about 0.2 mm or so.

Figure 8:
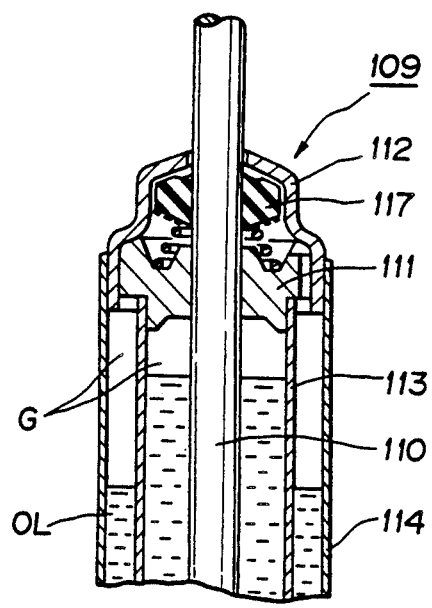
FIG. 8 is a sectional view of a shock absorber which incorporates a sealing device of the type to which the present invention pertains.
Figure 9A:
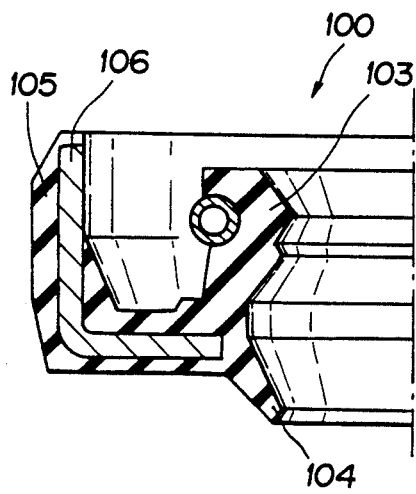
FIGS. 9A, 9B and 10 are sectional views of known sealing devices.
Figure 9B:
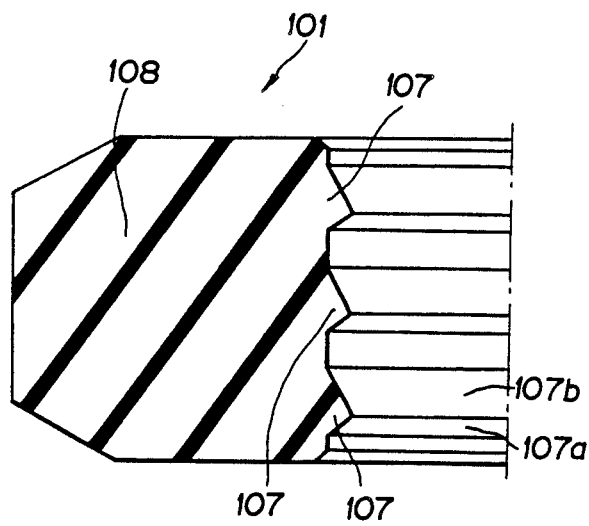
Figure 10:
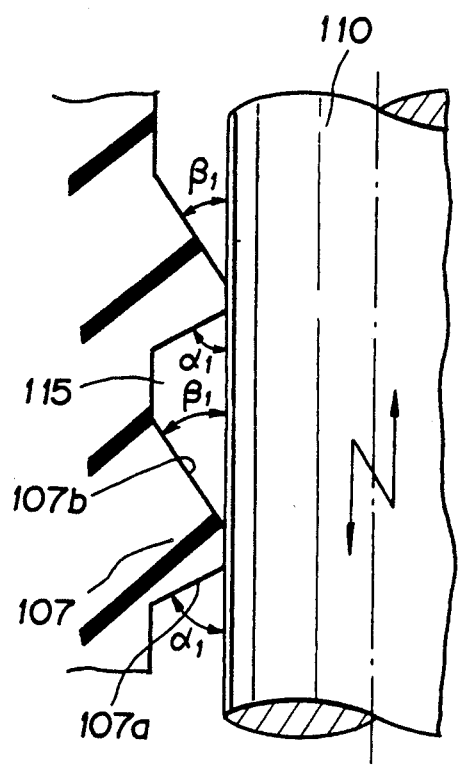

The sealing device 1 shown in FIG. 1 can be incorporated in, for example, an automotive shock absorber as shown in FIG. 8. In such a case, the sealing device 1 is set in sliding contact with the surface of a piston rod 22 as a reciprocating member. The notches 21 formed in the first seal lip 4 function to weaken the tightness of the main part 2 of the sealing device. In addition, the notches 21 allows the oil to come into the chamber 16 between the first and the second seal lips 4 and 5. The oil held in the chamber 16 effectively lubricates the sliding surfaces of the seal lips 4 and 5 so as to reduce the friction between the reciprocating. member 22 and these seal lips 4 and 5.

The oil held in the chamber 16 also serves to provide a higher sealing effect against leakage of compressed gas.

Figure 2:
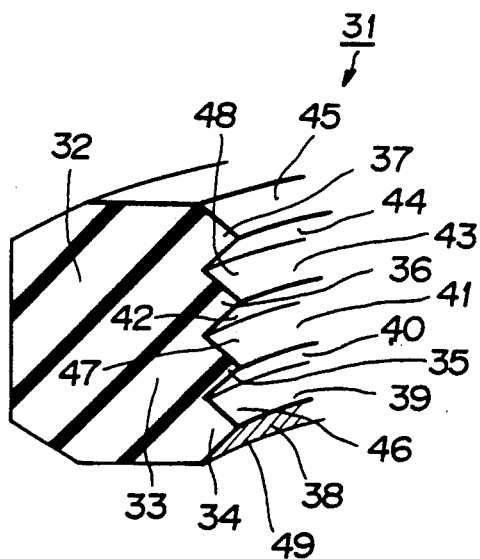
FIG. 2 is a perspective view of another embodiment of the present invention.
Figure 4:
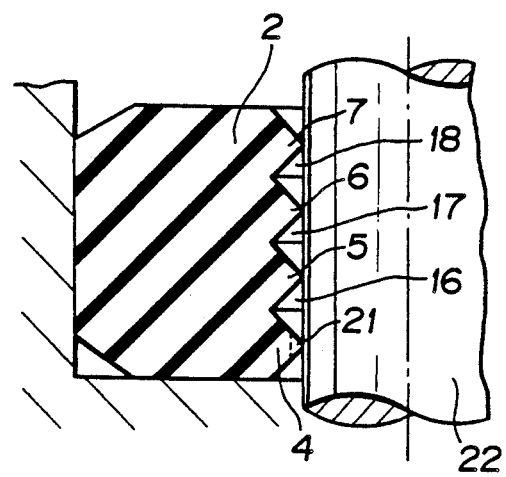
FIG. 4 is a vertical sectional view of a sealing device of the present invention in the state of use.

FIG. 2 shows a second embodiment of the sealing device in accordance with the present invention. The sealing device, generally denoted by 31, has a main part 32 which is provided on the inner periphery thereof with first to fourth seal lips 34, 35, 36 and 37 similar to the first embodiment shown in FIG. 1. The first seal lip 34, closest to the fluid such as an oil, has an inward projection provided with both tapered surfaces 38 and 39. Similarly, the second to fourth seal lips 35 to 37 have inward projections with both tapered surfaces 40, 41; 42, 43; and 44, 45. A recess or a chamber 46 is formed between the adjacent tapered surfaces 39 and 40 of the first seal lip 34 and the second seal lip 35. Similarly, chambers 47 and 48 are formed between adjacent tapered surfaces of the respective pairs of adjacent seal lips. The fluid-side tapered surface 38 of the seal first seal lip 34 closest to the fluid such as oil is provided with a multiplicity of minute grooves 49 over the entire circumferential length of the lip 34 so as to form a multiplicity of convexities and concavities in the tip of the first seal lip 34. These minute grooves 49 serve to reduce the tightness of the main part 32 of the sealing device and allows oil to enter the chamber 46 between the first and the second seal lips 34 and 35. The oil held in the chamber 46 effectively lubricates the sliding surfaces of the seal lips 34 and 35 so as to reduce the friction, and also serves to enhance the sealing effect against leakage of compressed gas. FIG. 4 illustrates the sealing device of FIG. 2 in the state of use in sliding contact with a reciprocating member.

Figure 3:
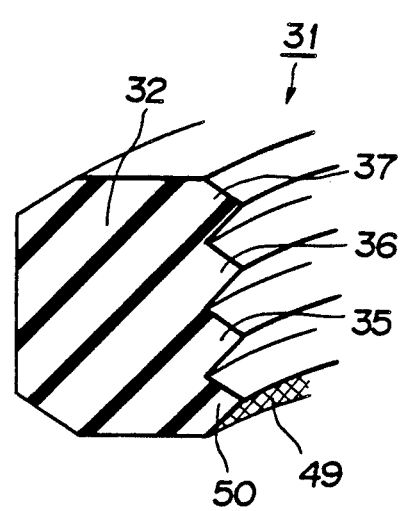
FIG. 3 is a perspective view of still another embodiment of the present invention.
Figure 5:
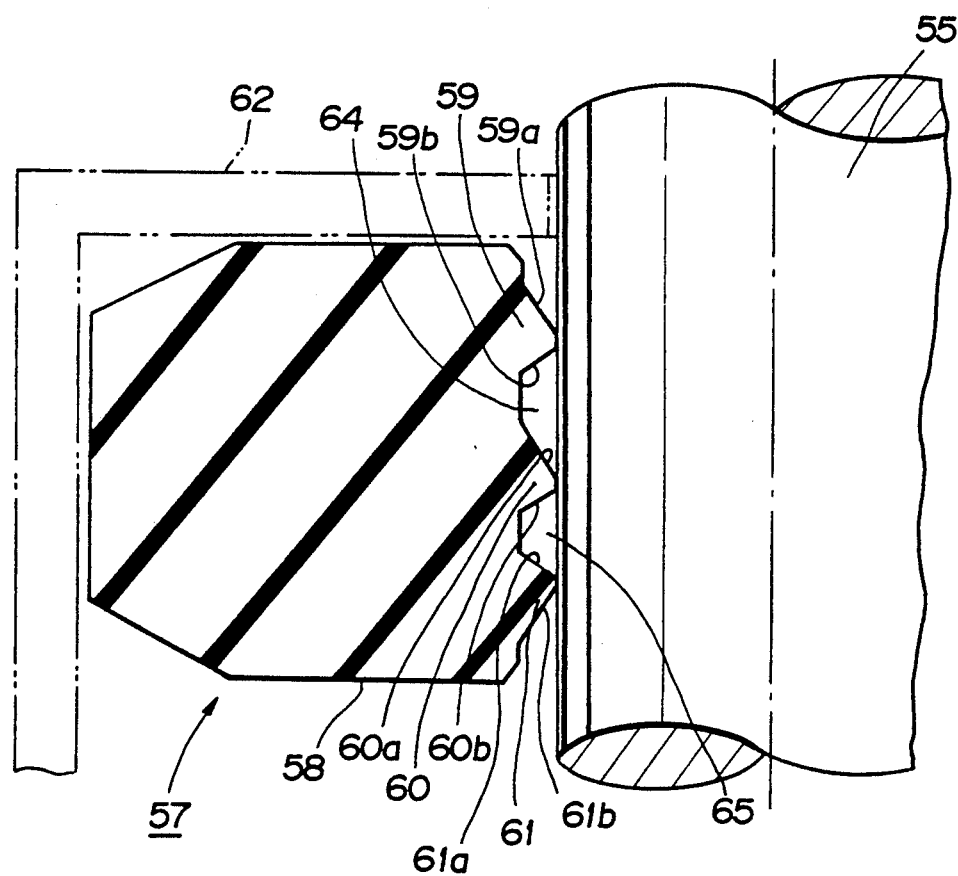
FIG. 5 is a side elevational view of a further embodiment of the present invention.
Figure 6:
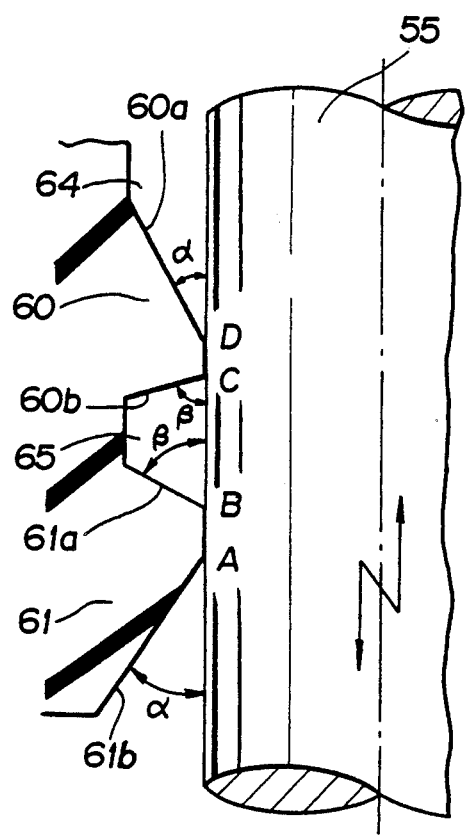
FIG. 6 is an illustration of a part of a seal lip explanatory of the contact angles of the surfaces of the seal lip and a reciprocating member.
Figure 7:
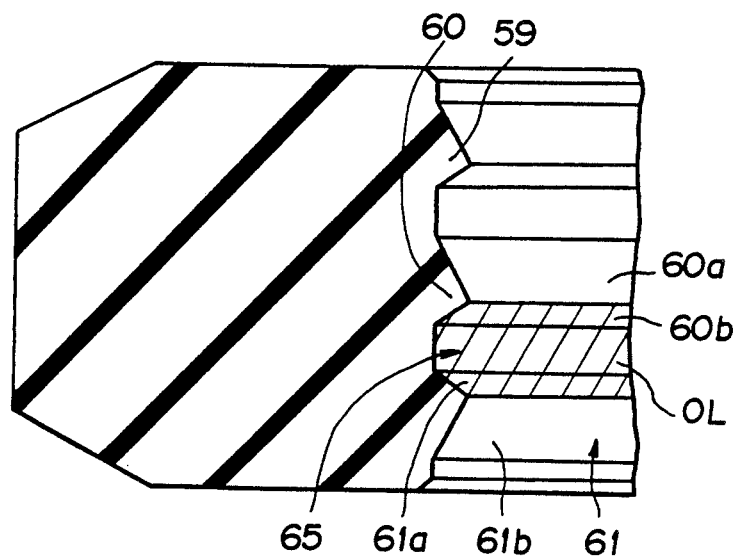
FIG. 7 is a sectional view of the embodiment shown in FIG. 5 illustrative of the state of holding of a fluid.

FIG. 3 shows a third embodiment of the sealing device in accordance with the present invention. This embodiment is materially the same as the embodiment shown in FIG. 2 except that minute convexities and concavities serving as recesses are formed on the fluid-side tapered surface 49 of the first seal lip 50 which is closest to the internal fluid such as an oil. The minute convexities and concavities can be formed by using a mold in which the mold cavity surface corresponding to the tapered surface 49 of the seal lip 50 has been roughened to a coarseness of 20 to 30 $\mu$Rmax by electric discharge. This embodiment also can be used in the manner shown in FIG. 4, and offers the same advantages as those expected from the first and the second embodiments FIGS. 5 to 7 shows a fourth embodiment of the sealing device in accordance with the present invention. The sealing device, generally denoted by 57, has three seal lips 59, 60 and 61 which have inward projections with tapered surfaces 59a, 60a and 61a adjacent to internal fluid, as well as tapered surfaces 59b, 60b and 61b adjacent to the atmosphere. A chamber 64 as a recess is defined between the adjacent tapered surfaces of the third and second seal lips 59, 60 and the piston rod 55. Similarly, a chamber 65 is defined between the second and first seal lips 60, 61 and the piston rod 55. The angles of the tapered surfaces 59a, 60a, 61a and 59b, 60b, 61b with respect to the piston rod 55 are determined as follows. Namely, in case of the third and second seal lips 59 and 60, the angles of the tapered surfaces adjacent to the atmosphere with respect to the outer peripheral surface of the piston rod 55 is determined to be smaller than the angles of the tapered surfaces 59b, 60b adjacent to the internal fluid to be sealed, as in the case of the known sealing device explained before. For instance, in regard to the second seal lip 60, the angle $\alpha$ at which the tapered surface 60a contacts with the outer peripheral surface of the piston rod 55 at a point D (see FIG. 6) and the angle $\beta$ at which the tapered surface 60b contacts the outer peripheral surface of the piston rod 55 at a point C is determined to meet the condition of $\alpha < \beta$. In case of the first seal lip 61 which is the closest to the internal fluid to be sealed, the contact angles are determined in a manner contrary to the case of the conventional arrangement: namely, the angle $\beta$ at which the atmosphere-side tapered surface 61a contacts with the outer peripheral surface of the piston rod at a point B and the angle $\alpha$ at which the fluid-side tapered surface 61b contacts with the outer peripheral surface of the piston rod 55 at a point A are determined to meet the condition of $\alpha < \beta$. The chamber 65 formed between the second seal lip 60 and the first seal lip 61 has a substantially trapezoidal cross-section as will be seen from FIG. 6.

In operation, as the piston rod 55 starts to reciprocate, an oil OL attaching to the rod 55 is brought to the region where the tapered surface 61b of the first seal lip contacts the outer peripheral surface of the piston rod 55 at the point A. Since the contact angle at the point A is determined to be smaller than the angle at the contact point B, the oil OL is allowed to come into the chamber 65. The oil OL which has entered the chamber 65 tends to come into the chamber 64 which is on the opposite side of the second seal lip 60 to the chamber 65, but this tendency is suppressed since the angle at which the tapered surface 60b contacts the piston rod at the point C is greater than the angle at which the tapered surface 60a contacts the piston rod 55 at the point D. Although a slight amount of oil OL may come into the chamber 64, such a small amount of oil can easily be brought back to the chamber 65 when the piston rod 55 moves downward as viewed in FIG. 6. In consequence, the oil OL wetting the surface of the piston rod 55 is accumulated and held in the chamber 65 during the reciprocating motion of the piston rod 55 as shown by hatching in FIG. 7. The oil OL held in the chamber 65 effectively lubricates the sliding surfaces of the seal lips 60 and 61 so as to reduce the friction between these seal lips and the piston rod.

It is conceiveable that the seal lip, particularly the first seal lip 61 closest to the fluid, is damaged to have, for example, minute scratches during long use of the sealing device. In the described embodiment, however, the oil OL which has an applicably high level of viscosity fills these minute scratches so as to prevent leakage of the compressed gas G which may otherwise escape through these minute scratches. Thus, the sealing device of this embodiment exhibits an enhanced sealing effect against leakage of the compressed gas when used in an automotive shock absorber.

In the embodiment illustrated in FIGS. 5 to 7, the angle $\alpha$ of contact of the fluid-side tapered surface 61b of the first seal lip is determined to be smaller than the angle $\beta$ of contact of the atmosphere-side tapered surface 61a of the same, whereas, in the cases of the second and the third seal lips, the contact angles of the fluid-side tapered surfaces 60b, 59b are determined to be greater than the contact angles of the fluid-side tapered surfaces 60a, 59a. This, however, is only illustrative and may be varied as desired provided that the contact angle of the fluid-side tapered surface 61b of the first seal lip is smaller than that of the atmosphere-side tapered surface 61a of the first seal lip. It will be clear to those skilled in the art that the embodiment described in connection with FIGS. 5 to 7 also can be used in the same manner as those of the preceding embodiments, i.e., in the manner shown in FIG. 4.

As will be understood from the foregoing description, in the sealing device of the present invention, the first seal lip is so designed as to facilitate flow of oil into the chamber 65 across the region of contact between the first seal lip closest to the internal fluid and the reciprocating member, while resisting the tendency for the fluid to flow backward from this chamber. In consequence, the tightness of the sealing device is weakened and the state of lubrication between the seal lips and the piston rod is improved to reduce the friction. In addition, the fluid such as oil which is held in the chamber between the first seal lip closest to the internal fluid and the adjacent second seal lip conveniently fills any scratch or other damages in the lip surface, so as to prevent leakage of another fluid such as compressed gas, thus attaining a higher sealing effect.

Although the invention has been described through its specific forms, it is to be understood that various changes and modifications may be imparted thereto without departing from the scope of the invention which is limited solely by the appended claims. In addition, the sealing device of the invention can be used in combination with various types of reciprocating member, although a piston rod of an automotive suspension has been specifically described as an example of such a reciprocating member.

What is claimed is:

1. A sealing device for use in combination with a reciprocating member having an outer surface, said sealing device comprising:

a sleeve surrounding the reciprocating member, said sleeve having an internal surface facing said reciprocating member, said internal surface having at least two axially spaced apart sealing lips surrounding and projecting towards said reciprocating member, said axial spacing defining a chamber between axially adjacent sealing lips, each sealing lip having a tip in contact with the outer surface of said reciprocating member, and each sealing lip having a first side facing internal fluid and an axially opposite second side facing atmosphere; and means provided on the sealing lip closest to said internal fluid for introducing internal fluid into said chamber between said sealing lip closest said internal fluid and the next adjacent sealing lip;

said means including tapered surfaces on the sealing lip closest to said internal fluid, said tapered surfaces being connected to said tip so that the tapered surface adjacent to said internal fluid makes a smaller angle to said reciprocating member than said tapered surface facing the atmosphere does and the sealing lip axially next to said sealing lip closest to said internal fluid also has tapered surfaces, said tapered surface of said axially next sealing lip facing said internal fluid making a greater angle to the surface of said reciprocating member than said tapered surface of said axially next sealing lip facing the atmosphere.

* * * * *